(12) United States Patent
Bahattab et al.

(10) Patent No.: US 8,871,838 B1
(45) Date of Patent: Oct. 28, 2014

(54) EPOXY-CARBON NANOMATERIAL BASED COATING AND METHOD FOR PREPARING THE SAME

(71) Applicant: King Abdul Aziz City for Science and Technology (KACST), Riyadh (SA)

(72) Inventors: Mohammed Abdullah Bahattab, Riyadh (SA); Musarrat Husain Jafri, Riyadh (SA); Andrei V Krauklis, Minsk (BY); Siarhei Zhdanok, Minsk (BY)

(73) Assignee: King Abdul Aziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 14/226,847

(22) Filed: Mar. 27, 2014

(51) Int. Cl.
*C08G 18/08* (2006.01)
*C08K 3/04* (2006.01)
*C09D 7/12* (2006.01)

(52) U.S. Cl.
CPC .................................. *C09D 7/1216* (2013.01)
USPC .......................................... 523/300; 524/495

(58) Field of Classification Search
USPC .......................................... 523/300; 524/495
See application file for complete search history.

(56) References Cited

U.S. PATENT DOCUMENTS

| | | | |
|---|---|---|---|
| 2007/0031660 A1* | 2/2007 | Kanamaru et al. | 428/355 AC |
| 2010/0210745 A1* | 8/2010 | McDaniel et al. | 521/55 |
| 2012/0082806 A1* | 4/2012 | Kissell et al. | 428/34.1 |

* cited by examiner

*Primary Examiner* — Hannah Pak
(74) *Attorney, Agent, or Firm* — Timberline Patent Law Group PLLC

(57) ABSTRACT

The invention provides method for preparing an epoxy-carbon nanomaterial coating which includes a base of a two-pack epoxy coating material, a hardener of the two-pack epoxy coating material and about 0.0125 wt % to about 0.2 wt % of carbon nanomaterial. The invention also provides a method for preparing the epoxy-carbon nanomaterial coating. More specifically, the invention provides a method for preparing epoxy based coating materials as anti-corrosive coating composition.

8 Claims, 3 Drawing Sheets

EPOXY-CARBON NANOMATERIAL BASED COATING AND METHOD FOR PREPARING THE SAME

FIELD OF THE INVENTION

The invention generally relates to an epoxy-based coating and a method for preparing the epoxy-based coating. More specifically, the invention relates to an epoxy-carbon nanomaterial based coating and a method for preparing the epoxy-carbon nanomaterial based coating. Further, the invention provides a method for preparing epoxy based coating materials as anti-corrosive coating composition.

BACKGROUND OF THE INVENTION

Epoxy based coating materials are widely used in various industries. The epoxy based coating materials are mainly used due to the protective properties. The epoxy based coating materials are particularly used for protective coating of surfaces such as, but not limited to, glass and metallic surfaces. The epoxy based coating materials are used for forming firm films with high weather resistance properties.

Generally, before applying the epoxy based coating material on a surface, a hardener is introduced into the epoxy based coating material. However, a coating which results after hardening of the epoxy based paint work material possesses insufficient physiochemical properties. To improve properties of the epoxy coating material, various agents such as, but not limited to, curing agents, reinforcing agents, reactive diluent, hardeners, thermal stabilizers, Ultra-Violet (UV) stabilizers, coupling agents and refractive index modifiers are used. Various agents are required to be added to improve different properties of the epoxy based coating material.

Therefore, there is need for an improved epoxy based coating and a method for preparing the improved epoxy based coating.

DETAILED DESCRIPTION OF THE INVENTION

Before describing in detail embodiments that are in accordance with the invention, it should be observed that the embodiments reside primarily for an epoxy-carbon nanomaterial based coating and in method steps related to preparing the epoxy-carbon nanomaterial based coating.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method or composition that comprises the element.

Generally speaking, pursuant to various embodiments, the invention provides an epoxy-carbon nanomaterial based coating and a method for preparing the epoxy-carbon nanomaterial based coating.

In various embodiments of the invention, an epoxy-carbon nanomaterial based coating composition comprises a base of a two-pack epoxy coating material, a hardener of the two-pack epoxy coating material and about 0.0125 weight percentages (wt %) to about 0.2 wt % of carbon nanomaterial. In an embodiment, the base of the two-pack epoxy coating material is one of Epichlorohydrin and Bisphenol. The hardener of the two-pack epoxy coating material is one of aliphatic polyamine and aromatic polyamine.

In various embodiments of the invention, the method for preparing the epoxy-carbon nanomaterial based coating comprises mechanically mixing starting materials. The starting materials include a base of a two-pack epoxy coating material, a hardener of the two-pack coating material and carbon nanomaterial. The method includes mixing carbon nanomaterial with the base of the two-pack epoxy coating material to prepare dispersion. The method further includes blending the dispersion with the hardener of the two-pack epoxy coating material. Alternatively, the carbon nanomaterial can be mixed with the hardener of the two-pack epoxy coating material to prepare dispersion. Thereafter, the dispersion can be blended with the base of the two-pack epoxy coating material.

Figure 1:
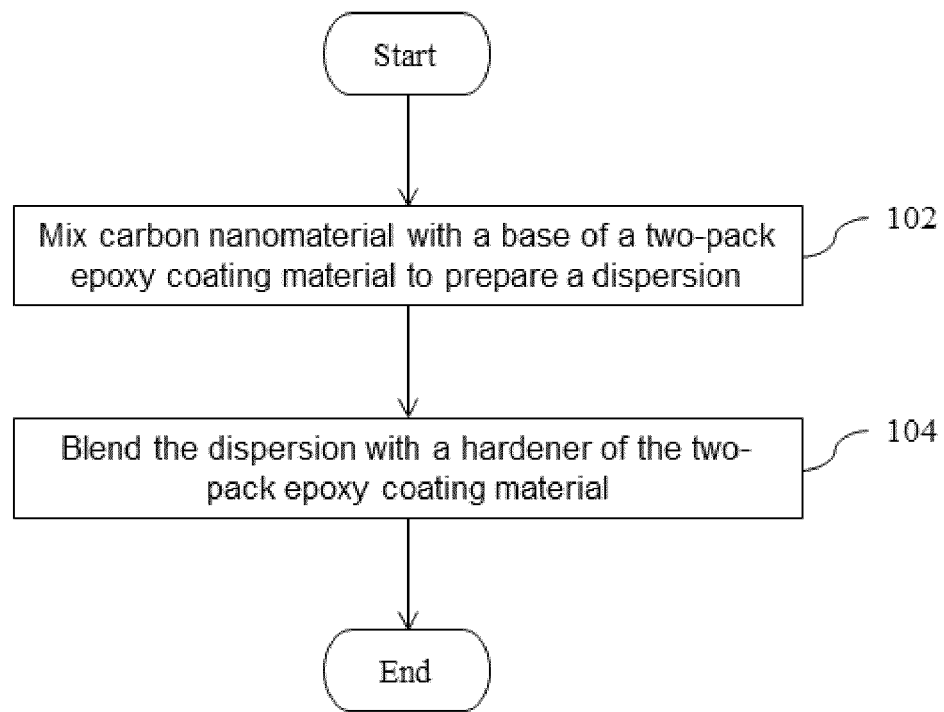
FIG. 1 illustrates a flow diagram of a method for preparing an epoxy-carbon nanomaterial based coating in accordance with an embodiment of the invention.

FIG. 1 illustrates a flow diagram of a method for preparing an epoxy-carbon nanomaterial based coating in accordance with an embodiment of the invention.

At step 102, carbon nanomaterial is mixed with a base of a two-pack epoxy coating material to prepare dispersion. The amount of carbon nanomaterial mixed with the base is such that the amount of the carbon nanomaterial in the final product, which is the epoxy-carbon nanomaterial based coating, ranges from weight ratio of about 0.0125 wt % to about 0.2 wt %. The carbon nanomaterial is mixed with the base of the epoxy coating material using one of normal mixing technique, ultrasonic bath treatment and non-ionic surfactant technique. Any other suitable technique which would be as such apparent to those skilled in the art can be used to prepare the dispersion.

In normal mixing technique, the carbon nanomaterial is mixed with the base of the two-pack epoxy coating material for a period of about 5 minutes to about 30 minutes and at a speed of about 500 revolutions per minute (rpm) to about 3000 rpm. For example, the carbon nanomaterial is mixed with the base for a period of 15 minutes and at the speed of 2000 rpm.

In ultrasonic bath treatment, the carbon nanomaterial is mixed with a solvent to prepare mixture. The solvent can be one or more of, but not limited to, acetone, methyl ethyl ketone, ethyl acetate, propanol, isobutanol, ethanol, dimethylformaldehyde, white spirit, mineral turpentine, toluene and xylene dimethylsulphoxide. Any other suitable surfactant which would be apparent to those skilled in the art can be used. Thereafter, the mixture is treated in an ultrasonic bath for a period of about 5 minutes to about 30 minutes at room temperature. For example, the mixture is treated in an ultrasonic bath for a period of 15 minutes at room temperature. Thereafter, the mixture is stirred with the base of the two-pack epoxy coating material for a period of about 5 minutes to about 30 minutes and at a speed of about 500 rpm to about 3000 rpm. For example, the mixture is stirred with the base for a period of 15 minutes and at the speed of 2000 rpm.

In the non-ionic surfactant technique, a surfactant is dissolved with a solvent to prepare a surfactant-solvent solution. The surfactant can be one or more of, but not limited to, polyvinylpyrrolidone (PVP), polyethylene glycol alkylphenyl ether (OP-10), ethoxylated nonylphenol (Neonol) and polyethylene glycol sorbitan monolaurate (TWEEN 20®). The solvent can be one or more of, but not limited to, acetone, methyl ethyl ketone, ethyl acetate, propanol, isobutanol, ethanol, dimethylformaldehide, white spirit, mineral turpentine, toluene and xylene dimethylsulphoxide. Any other suitable solvent which would be apparent to those skilled in the art can be used. Thereafter, the carbon nanomaterial is mixed with the surfactant-solvent solution for a period of about 5 minutes to about 30 minutes at room temperature to prepare a mixture. For example, the carbon nanomaterial is mixed with the surfactant-solvent solution for a period of 15 minutes at room temperature to prepare a mixture. Finally, the mixture is stirred with the base or the hardener of the two-pack epoxy coating material for a period of about 5 minutes to about 30 minutes and at a speed of about 500 rpm to about 3000 rpm. For example, the mixture is stirred with the base or the hardener for a period of 15 minutes and at a speed of 2000 rpm.

Figure 2:
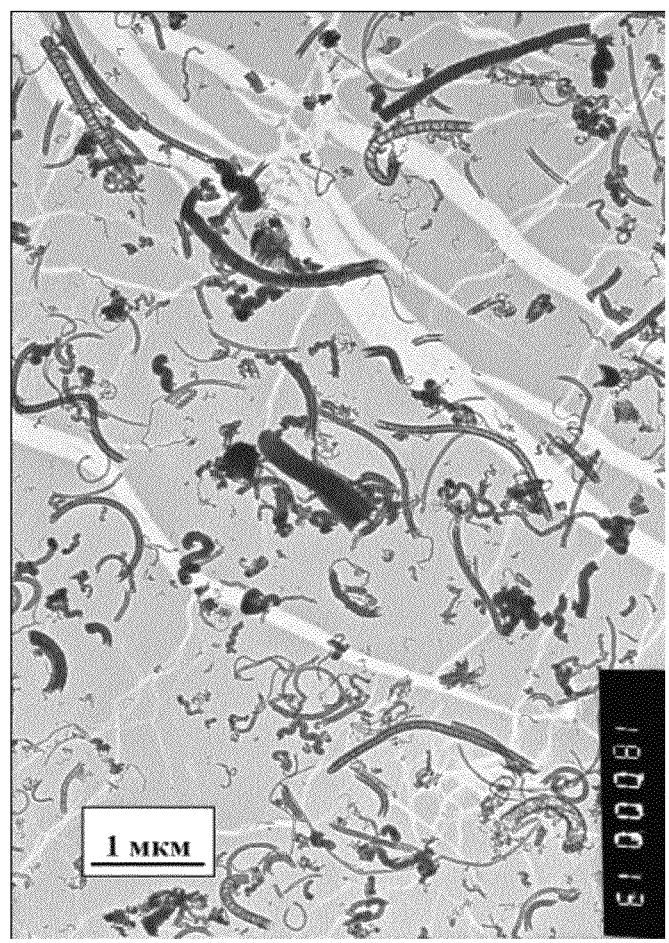
FIG. 2 illustrates a Transmission Electron Microscopy (TEM) image of the carbon nanomaterial used in the invention.
Figure 3:
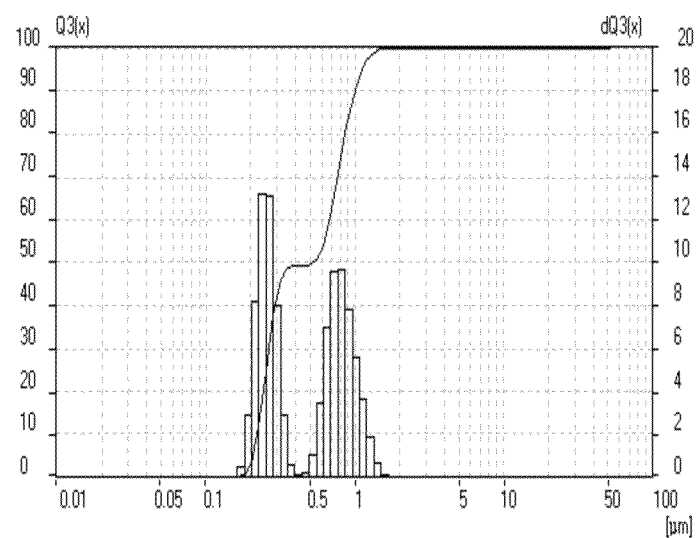
FIG. 3 is a graph representing distribution of carbon nanomaterial particles in a suspension after purification.

The raw material used to synthesize or purify carbon nanomaterial includes approximately a mixture of 24 weight percent (wt %) to 40 wt % of carbon nano-fibers, 10 wt % to 15 wt % of single-walled carbon nanotubes, 10 wt % to about 15 wt % of multi-walled carbon nanotubes, 10 wt % of solid graphite aggregates and about 5 wt % of metal particles. The carbon nanomaterial is synthesized using at least one of Electric Discharge Plasma (EDP) and a Floating Catalyst Chemical Vapor Deposition (FC-CVD) technique. Any other suitable technique which would be apparent to those skilled in the art can be used to synthesize the carbon nanomaterial. In the FC-CVD technique, toluene is used as a source of hydrocarbon and hydrogen as a reacting gas at 300 milliliter per minute (ml/min) at 900 degree Celsius (° C.). Submicron fraction of carbon nanomaterial can also be synthesized and used in the step 102. FIG. 2 illustrates a Transmission Electron Microscopy (TEM) image of the carbon nanomaterial used in the invention. FIG. 3 is a graph representing distribution of carbon nanomaterial particles in a suspension after purification.

The carbon nanomaterial includes one or more of, but not limited to, carbon nano-fibers and multi-walled carbon nanotubes. In an embodiment, the carbon nanomaterial includes about 80 wt % to about 90 wt % of carbon nano-fibers and about 10 wt % to about 20 wt % of multi-walled carbon nanotubes.

The base of the two-pack epoxy coating material can be selected from a group which includes epichlorohydrin and bisphenol A. The hardener of the two-pack epoxy coating material can be selected from a group which includes aliphatic polyamine and aromatic polyamine. Any suitable base and hardener of a two-pack epoxy coating material can be used for preparing the epoxy-carbon nanomaterial based coating composition and as such would be apparent to those skilled in the art.

At step 104, the dispersion is blended with the hardener of the two-pack epoxy coating material. The dispersion is blended with the hardener of the two-pack epoxy coating material by mechanically mixing the dispersion with the hardener for period of about 5 minutes to about 15 minutes and with speed of about 300 rpm to about 800 rpm. For example, the dispersion is mechanically mixed with the hardener for a period of 5 minutes and with a speed of 500 rpm.

Alternatively, in an embodiment, at step 102, carbon nanomaterial is mixed with the hardener of a two-pack epoxy coating material to prepare dispersion (not shown in FIG. 1). Thereafter, at step 104, the dispersion is blended with the base of the two-pack epoxy coating material to obtain the epoxy-carbon nanomaterial based coating (not shown in FIG. 1).

Working Example 1

A dispersion of carbon nanomaterial was prepared by mixing 0.025 grams (gms) of the carbon nanomaterial in a dispersant which includes 10 milliliters (ml) of acetone and 5 ml of neonol surfactant. The dispersion was treated in an ultrasonic bath for a period of 15 minutes. Thereafter, the dispersion was mechanically mixed with 40.1 ml of a Jotamastic 87® hardener for a period of 15 minutes and at a speed of 2000 rpm to prepare a mixture. The mixture was mechanically mixed with 250 ml of a Jotamastic 87® epoxy base for a period of 5 minutes and at a speed of 500 rpm to obtain the epoxy-carbon nanomaterial based coating composition.

Working Example 2

A dispersion of carbon nanomaterial was prepared by mixing 0.05 gm of the carbon nanomaterial in a dispersant which includes 20 ml of acetone and 5 ml of neonol surfactant. The dispersion was treated in an ultrasonic bath for a period of 15 minutes. Thereafter, the dispersion was mechanically mixed with 100 ml of a Sipoxy shield 565® hardener for a period of 15 minutes and at a speed of 2000 rpm to prepare a mixture. The mixture was mechanically mixed with 250 ml of a Sipoxy shield 565® epoxy base for a period of 5 minutes and at a speed of 500 rpm to obtain the epoxy-carbon nanomaterial based coating composition.

Working Example 3

A dispersion of carbon nanomaterial was prepared by mixing 0.05 gm of the carbon nanomaterial in a dispersant which includes 10 ml of acetone and 5 ml of neonol surfactant. The dispersion was mechanically mixed for a period of 15 minutes and at a speed of 2000 rpm. Thereafter, the dispersion was mechanically mixed with 41.5 ml of a Jotamastic 87® epoxy base for a period of 15 minutes and at a speed of 2000 rpm to obtain a mixture. The mixture was mechanically mixed with 250 ml of a Jotamastic 87® hardener for a period of 5 minutes and at a speed of 500 rpm to obtain the epoxy-carbon nanomaterial based coating composition.

Various epoxy-carbon nanomaterial based coating compositions including different wt % of carbon nanomaterial were prepared using the method described above. Table 1 provides details about some of the epoxy-carbon nanomaterial based coating compositions prepared using the method described above.

TABLE 1

| Code | Epoxy paint type | Carbon nanomaterial (in wt %) | Technique used to prepare the carbon nanomaterial | Technique used to mix carbon nanomaterial |
|---|---|---|---|---|
| EP1 | Jotamastic 87 ® | 0 | EDP | Normal mixing |
| EP2 | Jotamastic 87 ® | 0.05 | EDP | Ultrasonic bath |
| EP3 | Jotamastic 87 ® | 0.05 | CVD | Ultrasonic bath |
| EP4 | Jotamastic 87 ® | 0.05 | CVD | Normal mixing |
| EP5 | Jotamastic 87 ® | 0.025 | CVD | Nonionic surfactant |
| EP6 | Jotamastic 87 ® | 0.025 | EDP | Nonionic surfactant |
| EP7 | Jotamastic 87 ® | 0.05 | EDP | Nonionic surfactant |
| EP8 | Jotamastic 87 ® | 0.05 | CVD | Nonionic surfactant |
| EP9 | Jotamastic 87 ® | 0.064 | CVD | Nonionic surfactant |
| EP10 | Jotamastic 87 ® | 0.064 | EDP | Nonionic surfactant |
| EP11 | Jotamastic 87 ® | 0.10 | EDP | Nonionic surfactant |
| EP12 | Jotamastic 87 ® | 0.20 | EDP | Nonionic surfactant |
| EP13 | Jotamastic 87 ® | 0.0125 | EDP | Nonionic surfactant |
| EP14 | Jotamastic 87 ® | 0.0125 | EDP | Nonionic surfactant |
| EP15 | Sipoxy Shield 656 ® | 0 | EDP | Normal mixing |
| EP16 | Sipoxy Shield 656 ® | 0.05 | EDP | Ultrasonic bath |
| EP17 | Sipoxy Shield 656 ® | 0.10 | EDP | Ultrasonic bath |

One or more of the epoxy-carbon nanomaterial based coating compositions prepared using the method described above were used for coating surface of glass or metal panels for characterization of various properties of the epoxy-carbon nanomaterial based coating compositions. Various tests were performed on the epoxy-carbon nanomaterial based coating prepared using the method described above. The tests were performed to check the physio-chemical properties of the epoxy-carbon nanomaterial based coating compositions. The hardness of the coating compositions was determined using pendulum oscillation technique according to ASTM D4366. The number of oscillation increases with increase of hardness of the coatings. The abrasion resistance of the coating compositions was determined according to ASTM D2228 by Taber® abrader using 100-500 cycles under 1 kilogram (kg) load on the coated surface. The gloss of coatings was also measured before and after abrasion at 20° and 60°. The scratch resistance of the coatings was determined according to ASTM D335 by cross-cut at 1 millimeter (mm) apart and an adhesion test was performed by pressing adhesive tape on the cross-cut area. When more than 65% cross-cut area is removed with adhesive tape, a mark of '0B' is used. Similarly, 1B for 35-65%, 2B for 15-35%, 3B for 5-15%, 4B for less than 5% and 5B for 0% removal of cross-cut coated films are used. The impact resistance of the coating compositions was determined according to ASTM D2794 using a Gardner Heavy Weight Duty Variable Height Impact Tester (model IG-1120) by dropping a load of 2 kg from a height of 100 centimeter (cm). The coated films did not break, though the coated substrates broke under the impact of 2 kg fallen from 120 cm height. The chemical resistance test was performed on the coating compositions using acid solution (10%-50%) and alkali solution (10%-50%) on the coated surface. The results of the tests used to characterize various properties of the epoxy-carbon nanomaterial based coating compositions are provided in Table 2. Table 2 provides data regarding tests performed on surface of glass or metal panels coated with the epoxy-carbon nanomaterial based coating compositions enlisted in Table 1.

The data in Tables 2 indicates that when carbon nanomaterial in the range of about 0.0125 wt % to about 0.2 wt % is dispersed in the epoxy carbon nanomaterial based coating compositions, the physiochemical properties of the coating composition are improved. Based on experiments and observations, the property of hardness was observed to improve after incorporation of carbon nanomaterial in the coating composition. The abrasion resistance was markedly improved in the epoxy-carbon nanomaterial based coatings compared to epoxy coatings without carbon nanomaterial. Gloss loss after abrasion was higher in the coatings with carbon nanomaterial irrespective of Jotamastic 87® or Sipoxy Shield 656® epoxy material. The adhesion by cross-cut method showed improved adhesion for the epoxy-carbon nanomaterial based coatings. The chemical resistance by acid and alkali solutions (10%-50%) showed that the epoxy-carbon nanomaterial based coatings passed the chemical tests. There was an improved impact resistance the epoxy-carbon nanomaterial based coatings.

Other test such as electrical, thermal, Ultra-Violet (UV) stability and humidity tests were also performed on the epoxy-carbon nanomaterial based coatings. The results of the electrical, thermal, Ultra-Violet (UV) stability and humidity tests are provided in Table 3. Table 3 provides data regarding electrical, thermal, Ultra-Violet (UV) stability and humidity tests performed on the epoxy-carbon nanomaterial based coating compositions enlisted in Table 1.

TABLE 3

| Code | Impedance (Ohm.cm$^2$) at 24 hours | Thermal Gravimetric Analysis (TGA) | | UV-A test 340 nanometer (nm) for 500 hours | Humidity for 500 hours at 40° C. |
| --- | --- | --- | --- | --- | --- |
| | | Full degrade (° C.) | 50% Weight loss (° C.) | | |
| EP1 | 3 × 10$^5$ | 540 | 400 | Pass | Pass |
| EP2 | 7 × 10$^7$ | ND | ND | Pass | Pass |
| EP3 | 7 × 10$^6$ | 550 | 405 | Pass | Pass |
| EP4 | 4 × 10$^6$ | 570 | 420 | Pass | Pass |
| EP5 | 7 × 10$^6$ | 560 | 430 | Pass | Pass |
| EP6 | 1 × 10$^6$ | 560 | 420 | Pass | Pass |

TABLE 2

| Code | Pendulum oscillation technique (No. of oscillation) | Abrasion after 1500 cycles under 1 kg load | | Adhesion (0B-5B) Cross-cut Method | Chemical resistance | | Impact resistance (direct) 2 kg load from 100 cm fall |
| --- | --- | --- | --- | --- | --- | --- | --- |
| | | Abraded area (%) | Gloss loss (%) | | 10-50% H$_2$SO$_4$ | 10-50% NaOH | |
| EP1 | 126 | 0.34 | 19 | 4B | Pass | Pass | Pass |
| EP2 | 132 | 0.26 | 53 | 5B | Pass | Pass | Pass |
| EP3 | 133 | 0.20 | 65 | 5B | Pass | Pass | Pass |
| EP4 | 135 | 0.16 | 54 | 5B | Pass | Pass | Pass |
| EP5 | 126 | 0.21 | 72 | 5B | Pass | Pass | Pass |
| EP6 | 118 | 0.18 | 64 | 5B | Pass | Pass | Pass |
| EP7 | 120 | 0.20 | 72 | 5B | Pass | Pass | Pass |
| EP8 | 121 | 0.22 | 74 | 5B | Pass | Pass | Pass |
| EP9 | 108 | 0.23 | 70 | 5B | Pass | Pass | Pass |
| EP10 | 115 | 0.22 | 85 | 5B | Pass | Pass | Pass |
| EP11 | 86 | 0.25 | 83 | 5B | Pass | Pass | Pass |
| EP12 | 102 | 0.32 | 55 | 5B | Pass | Pass | Pass |
| EP13 | 133 | 0.33 | 69 | 5B | Pass | Pass | Pass |
| EP14 | 156 | 0.35 | 67 | 5B | Pass | Pass | Pass |
| EP15 | 152 | 0.08 | 50 | 5B | Pass | Pass | 140 pass |
| EP16 | 165 | 0.17 | 68 | 5B | Pass | Pass | 140 pass |
| EP17 | 152 | 0.05 | 75 | 5B | Pass | Pass | 160 |

TABLE 3-continued

| Code | Impedance (Ohm.cm$^2$) at 24 hours | Thermal Gravimetric Analysis (TGA) | | UV-A test 340 | Humidity |
|---|---|---|---|---|---|
| | | Full degrade (° C.) | 50% Weight loss (° C.) | nanometer (nm) for 500 hours | for 500 hours at 40° C. |
| EP7  | $3 \times 10^6$ | ND  | ND  | Pass | Pass |
| EP8  | $2 \times 10^5$ | 550 | 410 | Pass | Pass |
| EP9  | ND              | 560 | 420 | Pass | Pass |
| EP10 | ND              | 560 | 420 | Pass | Pass |
| EP11 | $6 \times 10^6$ | 565 | 425 | Pass | Pass |
| EP12 | $4 \times 10^5$ | 545 | 420 | Pass | Pass |
| EP13 | $8 \times 10^6$ | ND  | ND  | Pass | Pass |
| EP14 | $6 \times 10^7$ | ND  | ND  | Pass | Pass |
| EP15 | $1 \times 10^6$ | 555 | 415 | ND   | ND   |
| EP16 | $6 \times 10^6$ | 560 | 420 | Pass | Pass |
| EP17 | $3 \times 10^6$ | ND  | ND  | Pass | Pass |

*ND: No Data available.

The data in Tables 3 indicates that when carbon nanomaterial in the range of about 0.0125 wt % to about 0.2 wt % is dispersed in the epoxy carbon nanomaterial based coating compositions, various other properties of the coating composition are improved. The impedance was found to be high (up to 7×107) for most of the epoxy-carbon nanomaterial based coatings. Thus, the epoxy-carbon nanomaterial based coatings show improved corrosion resistance. The thermal resistance is also increased for the epoxy-carbon nanomaterial based coatings. The full degradation and 50% weight loss of the epoxy-carbon nanomaterial based coatings are obtained at higher temperatures. When the epoxy-carbon nanomaterial based coatings were subjected to weathering tests under UVA –340 nm lamp for 500 hours, all the epoxy-carbon nanomaterial based coatings passed the test, indicating better UV stability. Similarly, when the epoxy-carbon nanomaterial based coatings were placed under humidity test for 500 hours at 40° C., all the epoxy-carbon nanomaterial based coatings passed the test, indicating better resistance to humidity.

Thus, the test revealed that the epoxy based coatings composition incorporated with about 0.0125 wt % to about 0.2 wt % improves hardness, abrasion resistance, adhesion by cross-cut, chemical resistance and impact resistance. Further, the epoxy-carbon nanomaterial based coatings also show improved electrochemical impedance (corrosion resistance), high thermal resistance, UV resistance and humidity resistance. The epoxy-carbon nanomaterial based coatings are transparent anti-corrosion coating materials which can be used in various coating applications such as, coating glass and metallic surfaces.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for preparing an epoxy-carbon nanomaterial based coating, the method comprising:
   mixing carbon nanomaterial with a base of a two-pack epoxy coating material to prepare a dispersion; and
   mechanically mixing the dispersion with a hardener of the two-pack epoxy coating material with a speed of about 300 to about 800 rpm for a period of about 5 minutes to about 15 minutes, wherein a weight ratio of the carbon nanomaterial in the epoxy-carbon nanomaterial based coating is about 0.0125 weight percent (wt %) to about 0.2 wt. %, wherein the carbon nanomaterial is mixed with the base of the two-pack epoxy coating material using at least one of (1) an ultrasonic bath treatment and (2) a non-ionic surfactant technique; wherein the ultrasonic bath treatment (1) comprises mixing the carbon nanomaterial with a solvent to prepare a mixture; treating the mixture in an ultrasonic bath for a period of about 5 minutes to about 30 minutes at room temperature and stirring the mixture with the base of the two-pack epoxy coating material for a period of about 5 minutes to about 30 minutes and at a speed of about 500 rpm to about 3000 rpm; and wherein the non-ionic surfactant technique (2) comprises dissolving a surfactant with a solvent to prepare a surfactant-solvent solution, mixing the carbon nanomaterial with the surfactant-solvent solution for a period of about 5 minutes to about 30 minutes at room temperature to prepare a mixture, and stirring the mixture with the base of the two-pack epoxy coating material for a period of about 5 minutes to about 30 minutes and at a speed of about 500 rpm to about 3000 rpm.

2. The method of claim 1, wherein the solvent is one of acetone, methyl ethyl ketone, ethyl acetate, propanol, isobutanol, ethanol, dimethylformaldehyde, white spirit, mineral turpentine, toluene and xylene dimethylsulphoxide.

3. The method of claim 2, wherein the surfactant is one of polyvinylpyrrolidone (PVP), polyethylene glycol alkylphenyl ether, ethoxylated nonylphenol and polyethylene glycol sorbitan monolaurate.

4. The method of claim 1, wherein the carbon nanomaterial is synthesized using at least one of Electric Discharge Plasma (EDP) and a Floating Catalyst Chemical Vapor Deposition (FC-CVD) technique.

5. The method of claim 1, wherein the carbon nanomaterial comprises at least one of carbon nano-fibers and multi-walled carbon nanotubes.

6. The method of claim 5, wherein the carbon nanomaterial comprises about 80 wt % to about 90 wt % of carbon nano-fibers and about 10 wt % to about 20 wt % of multi-walled carbon nanotubes.

7. The method of claim 1, wherein the base of the two-pack epoxy coating material is at least one of Epichlorohydrin and Bisphenol A.

8. The method of claim 1, wherein the hardener of the two-pack epoxy coating material is at least one of aliphatic polyamine and aromatic polyamine.

* * * * *